United States Patent [19]
Wuebbels et al.

[11] Patent Number: 6,073,429
[45] Date of Patent: Jun. 13, 2000

[54] MACHINE FOR MOWING CORN AND SIMILAR STALK-LIKE HARVESTED CROPS INDEPENDENTLY OF THE ROW

[75] Inventors: Richard Wuebbels, Rhede; Norbert Wolters, Gescher, both of Germany

[73] Assignee: Maschinenfabrik Kemper GmbH & Co. KG, Stadtlohn, Germany

[21] Appl. No.: 09/019,232

[22] Filed: Feb. 5, 1998

[30] Foreign Application Priority Data

Feb. 19, 1997 [DE] Germany ............... 297 02 902 U

[51] Int. Cl.[7] .................................................. A01D 34/66
[52] U.S. Cl. ............................................. 56/11.3; 56/13.6
[58] Field of Search .................................. 56/10.8, 11.2, 56/11.3, 6, 13.6, 16.4 R, 192, 370, 1, DIG. 1, 12.7

[56] References Cited

U.S. PATENT DOCUMENTS

| | | | |
|---|---|---|---|
| 3,717,981 | 2/1973 | Van Der Lely | 56/6 |
| 4,048,790 | 9/1977 | Zweegers | 56/13.6 |
| 4,631,910 | 12/1986 | Doyen et al. | 56/505 |
| 4,899,523 | 2/1990 | Frumholtz et al. | 56/13.6 X |
| 5,133,174 | 7/1992 | Parsons, Jr. | 56/6 |

*Primary Examiner*—Robert E. Pezzuto
*Attorney, Agent, or Firm*—Jordon and Hamburg LLP

[57] ABSTRACT

A machine for mowing corn and other similar stalk-like harvested crops independently of rows, has a plurality of feeding and mowing drums which, in an arrangement of mirror image symmetry on either side of a vertical, longitudinal median plane of the machine, are disposed centrally in front of a chopper with insertion rollers for the cut harvested crops. For a rotational movement about essential vertical axes of rotation, the feeding and mowing drums are driven by a driving mechanism, which can be connected to the central power train of the chopper and comprises two individual shaftings which are disposed on either side of the vertical, longitudinal median plane of the machine and in each case drive a group of feeding and mowing drums. The two shaftings are bridged by a connecting shaft, which can be connected to the central power train of the chopper and comprises a device which can be activated for a time-offset initiation of the rotational movement of the two shaftings when the machine is started up for the harvesting operation.

12 Claims, 3 Drawing Sheets

MACHINE FOR MOWING CORN AND SIMILAR STALK-LIKE HARVESTED CROPS INDEPENDENTLY OF THE ROW

BACKGROUND OF THE INVENTION

For such machines, the stalks of the harvested crops are drawn in the upright position by feeding and mowing drums and mown and subsequently supplied to the chopper by means of insertion rollers, with which the chopper is connected in series. All feeding and mowing drums are driven by one driving unit, which can be connected to the central power train of the chopper, which usually is self-propelled. In the course of the rationalization of the harvesting operation, large self-propelled up to 500 HP field choppers are used. Correspondingly large driving power is transferred to the feeding and mowing drums, of which two, three or more may be disposed on either side of the vertical, longitudinal median plane of the machine.

The propulsion of these combined feeding and mowing drums when the machine is started for harvesting operation turns out to be difficult owing to the fact that the masses, which are to be set in rotary motion, are very high. As a result, a high torque is required during the starting-up phase, in order to set the feeding and mowing drums of the machine in rotary motion with the required operating speed. A construction of the driving unit with two individual shaftings on either side of the vertical, longitudinal median plane of the machine, each driving a group of feeding and mowing drums, also basically does not lead to more advantageous conditions with respect to the starting-up behavior of the feeding and mowing drums, if the high starting-up torques are to be transferred simultaneously to all feeding and mowing drums of the machine over the central power train of the chopper.

It is an object of the invention to improve the starting-up conditions for the harvesting operation of machines of the given type.

SUMMARY OF THE INVENTION

Pursuant to the invention, this objective is accomplished by a development of the machine given in claim 1. By activating the equipment so that the rotational movement is commenced at different times in the two shaftings when the machine is started up for harvesting operations, it is possible, over the shaft, which brings about the connection with the central power train of the chopper and bridges the two shaftings, to start initially only one of the two shaftings and, with that, only one of the two groups of feeding and mowing drums on either side of the vertical longitudinal median plane of the machine. For a mirror image arrangement of the feeding and mowing drums on either side of the vertical, longitudinal median plane, this means a halving of the starting-up torque, which must be transferred from the connecting shaft to the connected shafting, in order to cause the feeding and mowing drums to rotate for the mowing operation. After a selectable period of time of the order of seconds after the one half of the machine has been started up, the other half of the machine can be started up by commencing the transfer of the rotational movement of the running connecting shaft to the other shafting, which is associated. in turn, in a manner which does not place an excessive strain on the motive power, with half the starting-up torque, which would be required to start up both halves of the machine simultaneously.

In principle, the two individual shaftings themselves could be divided once or several times more for reducing the starting-up torque for the harvesting operation even further and started up over the connecting shaft consecutively with selectable time intervals or alternatively on both halves of the machine by the appropriate construction of the equipment for the time-offset initiation of the rotational movement.

In a further development of the invention, the equipment for the time-offset initiation of the rotational movement of the two shaftings comprises a clutch inserted in the connecting shaft, preferably a non-positive clutch, which is assigned to one of two transmissions, over which the connecting shaft is connected with the individual shaftings for transferring its rotational movement to these.

As non-positive clutch, as preferred in conjunction with the time-offset starting-up of the two halves of the machine, all suitable friction clutches come into consideration, which can be engaged during the operation, that is, brought into coupling engagement, when one of the two shafts, in the present case the connecting shaft, is rotating and the other shaft, in the present case the shafting of one half of the machine or of the transmission allocated to the shafting, is stopped. In this connection, especially disk clutches and cone clutches are named. In principle, however, positive clutches, such as jaw clutches, are also suitable, provided that they are equipped with a synchronizing mechanism for achieving synchronization between the parts that are to be coupled. In a similar manner, electric clutches or hydrodynamic clutches are also suitable for the indicated use.

A particularly preferred development of the invention sees to it that the connecting shaft is equipped with two starting-up clutches, each assigned to one of the transmissions, and that the clutch can be coupled with and disengaged from one of the two starting-up clutches for transferring torque. These starting-up clutches can be used in all suitable embodiments based on friction clutches with appropriate speed shifting, in order to initiate the switching process only when a specified speed is achieved, so that a high starting torque is avoided. Theses starting-up clutches can be constructed at the same time as safety clutches by the appropriate adjustment of the structural elements producing the friction.

The clutch used with the equipment for the time-offset starting up of the two machine halves is advisably provided with an actuator included in an electronic control mechanism for its coupling engagement with the associated transmission or the associated starting-up clutch. Such an actuator, as actuating means for the clutch, can be formed, for example, from a hydraulic operating cylinder, which is connected with the hydraulic system of the field chopper or of the vehicle and the piston rod of which is in operative connection with the engaging and disengaging part of the clutch. In principle, however, other suitable elements, such as electric magnets or compressed air motors can also be used as actuator, provided that they are appropriate and suitable for use in conjunction with harvesting machines of the type under discussion here.

The control mechanism furthermore comprises a motion sensor or speed monitor which, when the machine is started for the harvesting operation, sends a signal, which announces the rotational movement of the connecting shaft, to the control mechanism in order to actuate the actuator of the clutch with time delay. For this purpose, the control mechanism may advisably comprise an adjustable time function element. When the machine is switched off, the motion sensor sends a negative signal, indicating the stoppage of the connecting shaft, to the control mechanism, with the consequence that the clutch is disengaged from the associated transmission or the associated starting clutch by appropriately returning the actuator.

Such a switching off of the machine results when the inlet region of the chopper and, with that, the insertion rollers of the chopper become blocked. The machine is then switched over manually from the field chopper or the vehicle to the reverse operation, whereupon the insertion rollers of the chopper rotate counter to the drawing-in direction, that is, backwards. Correspondingly, the feeding drums or conveying drums of the two halves of the machine must also rotate in the direction opposite to that of the harvesting operation, that is also backwards, in order to move the backed-up flow of harvested crops jointly from the insertion rollers of the chopper.

According to a further distinguishing feature of the invention, this mode of operation is made possible owing to the fact that the driving mechanism is equipped with a clutch, engaged in the direction of rotation, for simultaneously initiating the reverse rotary motion of the two shaftings in the reverse operation of the machine. The clutch, engaged in the direction of rotation corresponding to the reverse operation, forms, as freewheel clutch with the clutch disengaged, a direct driving connection from the connecting shaft to the transmission assigned to the clutch. On the other hand, when the connecting shaft is rotating in the other direction, the forwards direction for the harvesting operation, no torque is transmitted by the freewheel clutch. In this connection, as clutches engaged in the direction of rotation, all suitable overrunning and freewheel clutches can be used, such as so-called grip roller freewheel clutches, for which the outer ring of the clutch is secured in place relative to the inner ring by an inserted clamping element in the one direction, which corresponds to the reverse operation, while both rings can rotate relative to one another in the opposite direction of rotation, which corresponds to the harvesting operation.

After the backed-up material has been moved out of the insertion rollers by the reverse operation, the machine is started up once again in the manner explained above with a time difference between the starting-up of the first half of the machine and the second half of the machine. Aside from the already explained reduction in the starting-up torque, this has the particular advantage for the elimination of backed-up material owing to the fact that only half of the returned backed-up material is supplied to the insertion rollers of the chopper by that half of the machine started up first, so that these insertion rollers can effortlessly accommodate the flow of harvested crops, which has been reduced to about a half, just as they can the second half of the backed-up material when the second half of the machine is started up.

Further distinguishing features and advantages of the invention arise out of the claims and the description below in conjunction with the drawing, in which an example of the invention is illustrated diagrammatically.

IN THE DRAWINGS

FIG. 1 shows a plan view of a machine for mowing corn and similar stalk-like harvested crops, independently of the row, in conjunction with a chopper, FIG. 2 shows a plan view of the front, middle region of the mowing machine of FIG. 1 on a larger scale, FIG. 3 shows a plan view of the front, middle part of the machine of FIG. 1 to illustrate the reverse operation for eliminating backed-up material, and FIG. 4 shows a representation, corresponding to that of FIG. 3, to illustrate a different instantaneous state during the elimination of backed-up material.

DESCRIPTION OF THE PREFERRED EMBODIMENTS

Figure 1:
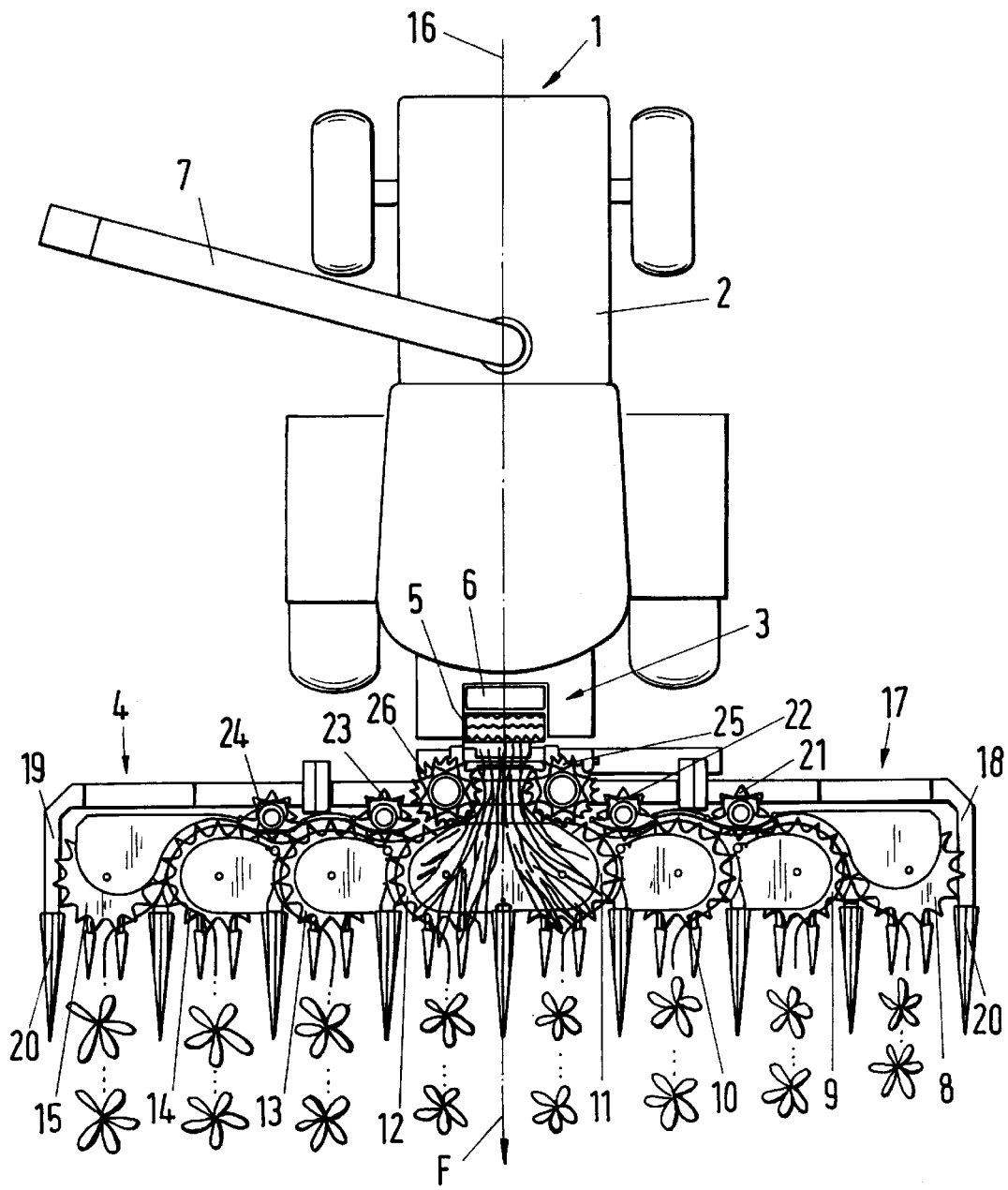

In FIG. 1, a field chopper 1 is shown, which comprises a self-propelled vehicle 2 with a chopper 3 and a machine, which is labeled 4 as a whole, for mowing corn and similar stalk-like harvested crops, independently of rows, as a mowing accessory in the form of an attachment for the vehicle 2, which is constructed as a tractor. The chopper 3 is disposed centrally with respect to the mowing machine 4 and has a pair of front insertion rollers 5 and a pair of rear insertion rollers 6, between which the mown harvested crop is supplied to the chopper blower, the details of which are not shown and in which it is comminuted and conveyed over the escape pipe 7, for example, to an agricultural, self-loading forage box.

The mowing machine 4, advanced according to FIG. 1 by vehicle 2 in the working and driving direction indicated by arrow F, comprises, in the case of the examples shown, a total of eight feeding and mowing drums 8 to 15, of which the feeding and mowing drums 8 to 11 are disposed as a group on the one side, the left side in the driving direction, and the feeding and mowing drums 12 to 15 are disposed as a group on the other side, the right side in the driving direction, of a vertical, longitudinal median plane 16 of the machine 4. The two groups of feeding and mowing drums 8 to 11, on the one hand, and 12 to 15, on the other, are arranged in mirror image symmetry to this longitudinal median plane 16.

The feeding and mowing drums 8 to 15 are surrounded at the side and rear by a machine frame 17, which is open at, in the driving direction F, front side. The machine frame 17 comprises lateral guides 18 and 19, which together determine the working width of the machine. The lateral guides 18 and 19 end at the front in each case in a divider point 20, which acts as a leaf lifter for the diagrammatically indicated harvested crops and prepares the mowing cut. Within the working width of the machine 4, further divider points of the same length as the divider points 20 and, between these, shorter divider points are disposed, which are fastened to the underside of the machine frame 17 in a manner not shown in detail.

The two groups of feeding and mowing drums 8 to 15 on either side of the longitudinal median plane 16 moreover include further conveying drums 21 and 22 or 23 and 24 for cut harvested crops in the gusset region near the chopper between adjacent feeding and mowing drums 9, 10, 11 of the one group of drums and 12, 13, 14 of the other group of drums. Furthermore, the two groups of drums additionally in each case comprise an inclined conveying drum 25, 26 at the side in front of the insertion rollers 5, 6 of the chopper 3. The inclined conveying drums 25 and 26 are disposed and designed to transfer the cut harvested crops transported by the feeding and mowing drums 8 to 11 and 12 to 15 including the conveying drums 21, 22 and 23, 24 from both sides of the machine and for feeding the harvested crops into the horizontal insertion gap between the insertion rollers 5, 6, which is higher than the mowing plane of the feeding and mowing drums 8 to 15.

For the rotary motion of the feeding and mowing drums 8 to 15 as well as of the conveying drums 22 to 24 about an essentially vertical axis of rotation, as well as for the rotary motion of the inclined conveying drums 25, 26 about the axes of rotation, which are inclined from the vertical by about 20E towards the horizontal, driving mechanism for the mowing machine 4 is provided, which can be connected to the central power train (not shown) of the chopper 3 and comprises two individual shaftings 27, 28 on either side of the vertical, longitudinal plane 16 of the mowing machine 4. Said shaftings 27, 28 in each case drive the group of feeding and mowing drums 8 to 11 and the conveying drums 21, 22 and the group of feeding and mowing drums 12 to 15 and the conveying drums 23, 24.

Figure 2:
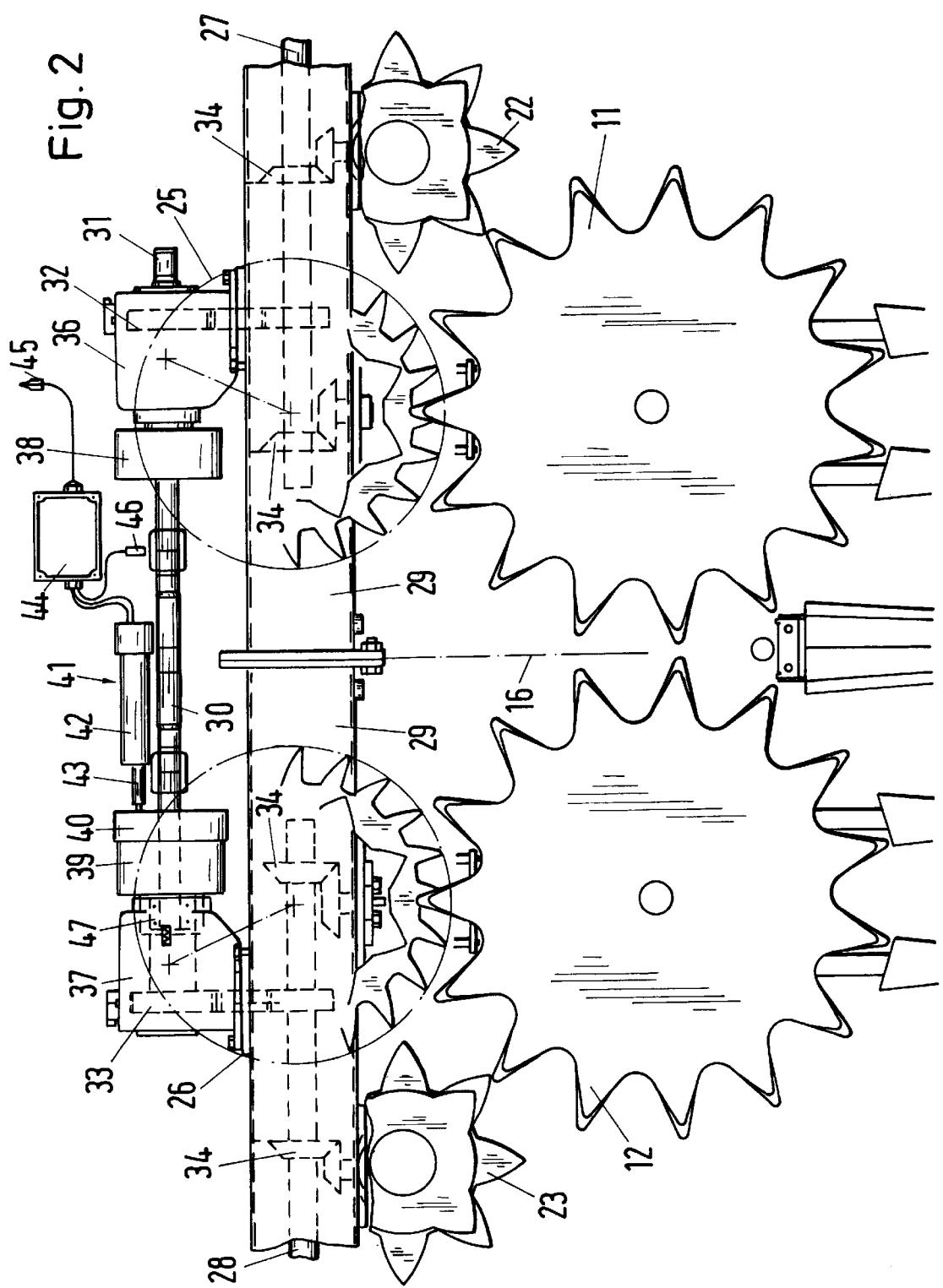

As shown particularly in FIG. 2, in which the representation is drawn on a larger scale, the two shaftings 27, 28 are rotatably supported in each case in a frame tube 29, which is fixed to the back of the machine frame 17 and consists of two tube halves flanged together along the vertical, longitudinal median plane 16. As furthermore shown in FIG. 2, the two individual shaftings 27 and 28 are bridged by a connecting shaft 30 as part of the driving mechanism. The connecting shaft 30 is provided with a connecting pin 31, with which it can be connected in a known manner, the details of which are not shown, to the central power train of the chopper 3 for the transfer of torque.

The connecting shaft 30 is connected over a transmission 32, 33, in each case in the form of a spur wheel chain, with the shafting 27 or 28 for transmitting its rotational movement. From the shaftings 27 and 28, the rotational motive power is passed on over bevel wheel gears 34 to the feeding and mowing drums 8 to 15 as well as to the conveying drums 21, 22 and 23, 24. For rotating the inclined conveying drums 25 and 26, of which only the drum shell and the axis of rotation are indicated in FIG. 2 by lines of dots and dashes, there are miter gears 36 and 37 at the end of the connecting shaft 30.

The connecting shaft 30 furthermore is equipped with two starting-up clutches 38, 39, which are assigned to the two transmissions 32, 33. Furthermore, a clutch 40 is assigned to the starting-up clutch 39. By means of an actuator 41, the clutch 40 can be engaged with and disengaged from the clutch 39. In the example shown, the actuator 41 is a working cylinder 42, which is actuated by a pressure medium and the piston rod 43 of which is in operative connection with the clutch 40, which is a non-positive clutch.

The actuator 41 is actuated by an electronic control mechanism 44, which is included in the driving mechanism and is provided with a connector plug 45 for connecting to the electrical system of the vehicle, such as a 12 volt direct current source. The control mechanism 44 furthermore comprises a motion sensor 46, which supplies a motion signal to the control mechanism 44, when the field chopper is started up for harvesting operation and the mowing machine 4 is connected from the vehicle 2.

For this starting up of the operation, the driving mechanism is in the initial position, in which the starting-up clutch 39 is disengaged and the starting-up clutch 38 is engaged. This means that, when starting up, only the group of drums, which is on the left side of the mowing machine 4 in the driving direction, is switched on by means of the rotating connecting shaft 30. Upon receiving the motion signal from the motion sensor 46, the control mechanism 44, with a time delay, which can be brought about by a built-in time function element, causes the actuator 41 to produce the coupling engagement of the clutch 40 with the starting-up clutch 39, so that the latter engages for transferring the rotary motion of the connecting shaft 30 to the transmission 33. Then, with the appropriate time delay, the group of drums, on the right of the machine in the driving direction, starts up. This latter group of drums includes the inclined conveying drum 26, which is driven directly by the connecting shaft 30 over the power train 37 after the clutch 39 engages. Likewise, the inclined conveying drum 25, which is driven by the connecting shaft 30 when the connecting shaft 30 starts up, is included in the group of drums on the left of the mowing accessory in the driving direction.

The motion sensor 46 furthermore sends a negative signal to the control mechanism 44 when the mowing machine 4 is switched off and the connecting shaft 30 comes to a stop. By means of this, the clutch 40 is disengaged from its coupling engagement by means of the actuator 41 and the initial position for starting up is restored. In this position, the starting up clutch 39 is disengaged. If the switching off of the mowing attachment 4 is caused by the backing up of the harvested crop in the region of the insertion rollers 5, 6 of the chopper 3, this backing up must be eliminated by reversing the operation, in that the insertion rollers 5, 6 are run backwards and the feeding and mowing drums 8 to 15 as well as all conveying drums 21 to 26 are also rotated backwards, counter to the direction of rotation during the harvesting operation.

Figure 3:
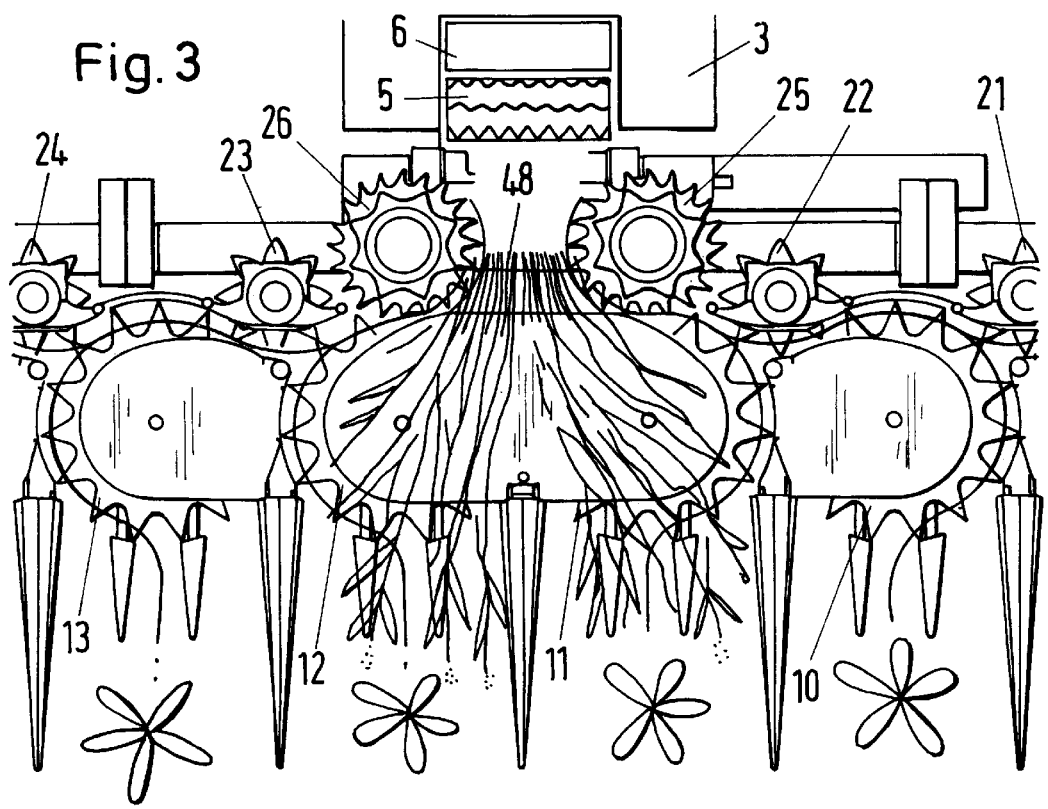
Figure 4:
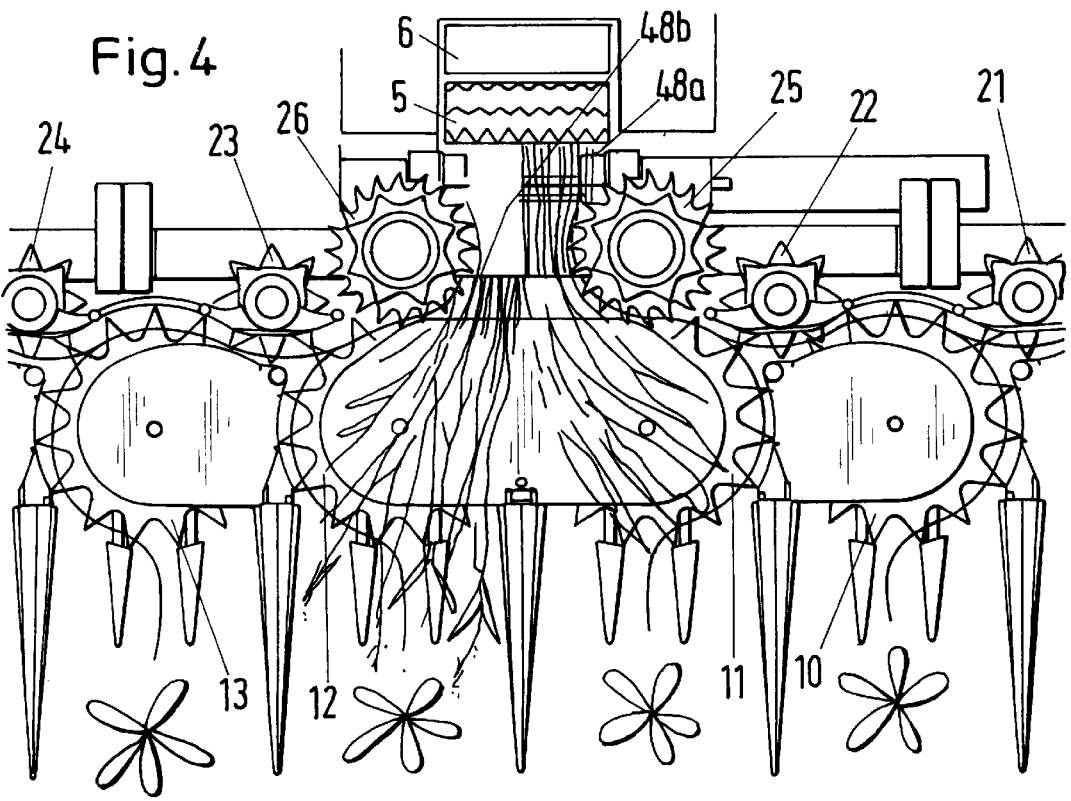

During the reverse rotation, the motive power which is provided to the group of drums, which is on the right of the machine in the driving direction F over the connecting shaft 30, is provided not directly over the starting-up clutch 39 taking up its disengaged initial state, but directly over a clutch 47, which is engaged in the direction of reverse rotation. The flow of harvested crops 48, which has caused the backing up in the region of the insertion rollers 5, 6 is, as shown in FIG. 3, moved back as a whole in the reversing operation with the help of the rearwards rotating drums, particularly between the inclined conveying drums 25 and 26. As a result, free space is formed in front of the insertion rollers 5, 6. If then the mowing machine 4 is started up, as explained above, initially only the group of drums, on the left of the mowing machine 4 in the driving direction F, starts up and, consequently, initially only half 48a of the flow of harvested crops is introduced into the insertion rollers 5, 6, as illustrated in FIG. 4, while the second half 48b of the flow of harvested crops, is supplied with the selected time offset to the insertion rollers 5, 6 after the starting up of the group of drums, which are on the right of the mowing machine 4 in the driving direction F. By this halving of the flow of harvested crops, the backing up of the harvested crops, which occurs during harvesting operation, can be eliminated quickly and reliably while a high starting-up moment is avoided.

What we claim is:

1. A machine moveable in a forward direction for mowing stalk-like harvested crops independently of rows, comprising a frame structure having an imaginary vertical longitudinal median plane, a plurality of feeding and mowing drums arranged as a symmetrical mirror image on each side of said median plane, a chopper disposed rearwardly of said drums, a central driving unit for driving said chopper, a first and a second shaft disposed on a first and second side respectively of said median plane, said first shaft being operable to drive the feeding and mowing drums on said first side of said median plane, said second shaft being operable to drive the feeding and mowing drums on said second side of said median plane, a bridge shaft connectable to said central driving unit, an operable drive mechanism operable to effect a sequential drive connection between said bridge shaft and said first shaft and between said bridge shaft and said second shaft, said operable drive mechanism including a first drive transmission between said bridge shaft and said first shaft for transferring the rotational movement of said bridge shaft to said first shaft and a second drive transmission between said bridge shaft and said second shaft for transferring the rotational movement of the bridge shaft to said second shaft, said first drive transmission including a clutch operable to connect and disconnect the transfer of the rotational movement from the bridge shaft to said first shaft.

2. A machine according to claim 1 wherein said operable drive mechanism includes a reversing clutch operable to simultaneously initiate rotational movement of the first and second shafts in a reverse direction.

3. A machine according to claim 2 wherein said operable clutch is disengaged when said reverse clutch is engaged, said reverse clutch when engaged providing a direct connection between said bridge shaft and said first drive transmission.

4. A machine according to claim 1 wherein said operable clutch is a non-positive clutch.

5. A machine according to claim 1 wherein said first and second drive transmissions include first and second start-up clutches respectively operable to connect and disconnect the transfer of the rotational movement from the bridge shaft to the respective first and second shaft, said operable clutch being operable with said first start-up clutch for connecting and disconnecting torque transmission between said operable clutch and said first start-up clutch.

6. A machine according to claim 1 wherein said operable drive mechanism includes an actuator for actuating said operable clutch and an electronic control mechanism for controlling said actuator.

7. A machine according to claim 6 wherein said control mechanism includes a motion sensor which senses when the machine is started up for harvesting and which provides a signal which is utilized for actuating said actuator.

8. A machine according to claim 7 wherein said motion sensor senses start of rotation of the bridge shaft.

9. A machine according to claim 7 wherein said control mechanism is operable to provide a time delay between the time said signal is initiated to the time that said actuator is actuated.

10. A machine according to claim 7 wherein said motion sensor provides a stop signal when rotation of the bridge shaft has stopped, said stop signal being fed to the control mechanism to disengage the operable clutch.

11. A method of operating a machine which moves in a forward direction for mowing stalk-like harvested crops independently of rows and in which the machine includes at least a first and second plurality of mowing drums comprising:

initiating operation of a main power source;

utilizing said power source to drive a bridge shaft;

initiating a first operable step of connecting said bridge shaft to a first shaft for driving said first plurality of mowing drums while providing a disconnected relationship between said bridge shaft and said second group of mowing drums such that said second group of mowing drums are not rotating during the first operable step;

initiating a second operable step connecting said bridge shaft to said second shaft for driving said second plurality of mowing drums while continuing driving of said first plurality of mowing drums; and introducing a time delay between the time said first operational step is initiated and the time that said second operable step is initiated.

12. A machine moveable in a forward direction for mowing stalk-like harvested crops independently of rows, comprising a frame structure having an imaginary vertical longitudinal median plane, a plurality of feeding and mowing drums arranged as a symmetrical mirror image on each side of said median plane, a chopper disposed rearwardly of said drums, a central driving unit for driving said chopper, a first and a second shaft disposed on a first and second side respectively of said median plane, said first shaft being operable to drive the feeding and mowing drums on said first side of said median plane, said second shaft being operable to drive the feeding and mowing drums on said second side of said median plane, a bridge shaft connectable to said central driving unit, and an operable drive mechanism operable to effect a sequential drive connection between said bridge shaft and said first shaft between said bridge shaft and said second shaft, said first and second shafts each including shaft subparts, said operable drive mechanism being operable to start operation of said shaft subparts in a time delay sequence.

* * * * *